Figure 1:
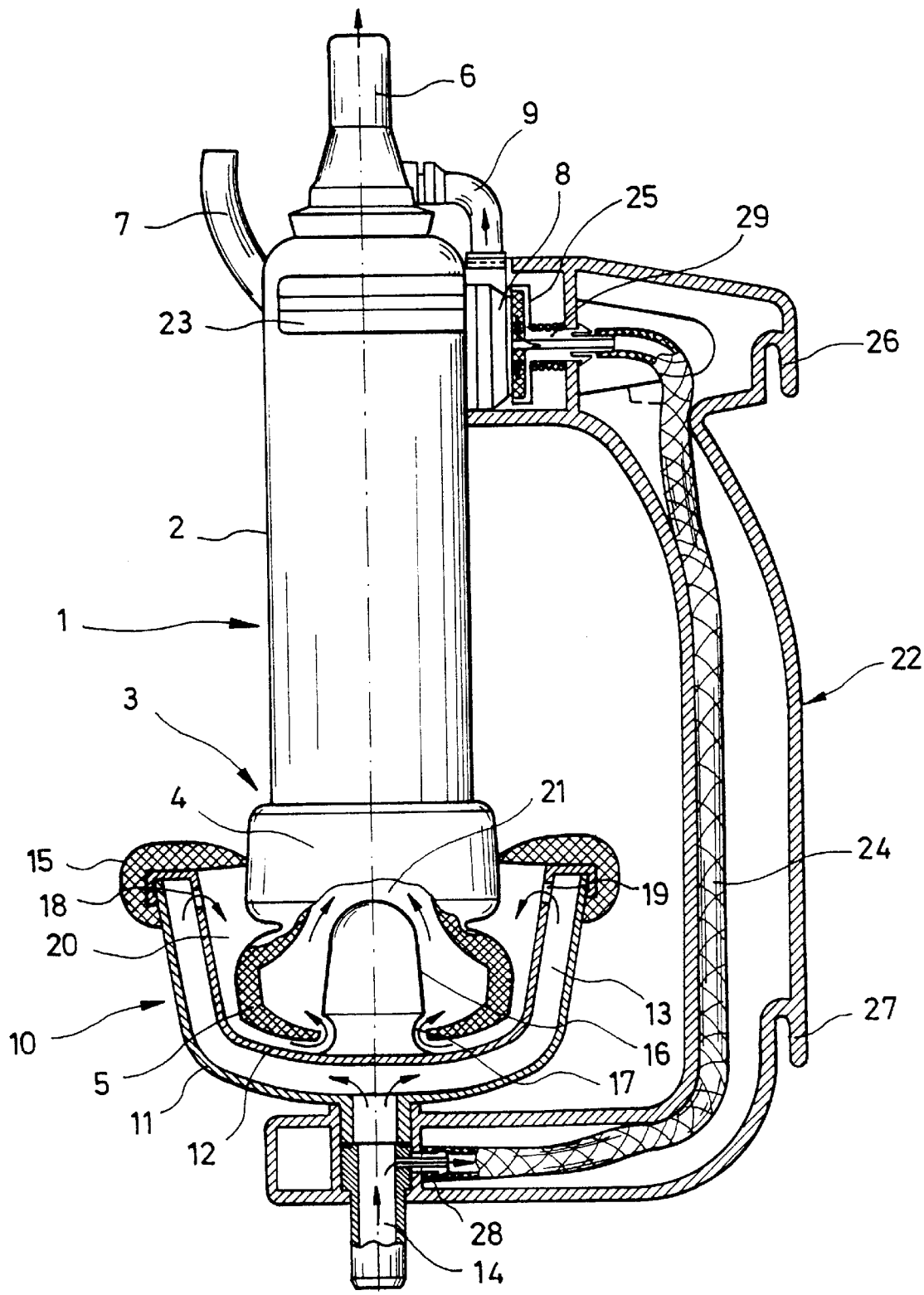

United States Patent
Laub-Maier et al.

[11] Patent Number: 5,863,349
[45] Date of Patent: Jan. 26, 1999

[54] DEVICE FOR CLEANING MILKING CUPS

[75] Inventors: Maria Laub-Maier, Tuerkheim; Jakob Maier, Jr., Griesstrasse 4, D-86842 Tuerkheim, both of Germany

[73] Assignee: Jakob Maier, Jr., Tuerkheim, Germany

[21] Appl. No.: 809,962

[22] PCT Filed: Sep. 13, 1995

[86] PCT No.: PCT/EP95/03608

§ 371 Date: Jun. 16, 1997

§ 102(e) Date: Jun. 16, 1997

[87] PCT Pub. No.: WO96/08137

PCT Pub. Date: Mar. 21, 1996

[30] Foreign Application Priority Data

Sep. 14, 1994 [DE] Germany ............................ 44 32 754.4

[51] Int. Cl.$^6$ ...................................................... B08B 9/02
[52] U.S. Cl. ................. 134/22.18; 134/170; 134/166 R; 134/166 C
[58] Field of Search ..................... 134/170, 171, 134/199, 169 C, 166 R, 22.18, 54, 900, 166 C

[56] References Cited

U.S. PATENT DOCUMENTS

| | | | |
|---|---|---|---|
| 1,178,817 | 4/1916 | Murton | 134/199 |
| 1,684,047 | 9/1928 | Stoven | 134/199 |
| 2,532,088 | 11/1950 | Cordis | 134/90 |
| 2,788,008 | 4/1957 | Wanzer | 134/170 |
| 3,012,566 | 12/1961 | Baker | 134/152 |
| 3,040,755 | 6/1962 | Sigmon et al. | 134/169 C |
| 3,421,527 | 1/1969 | Dettman | 134/199 |
| 3,958,584 | 5/1976 | Jones | 134/166 C |
| 4,042,416 | 8/1977 | Miskech | 134/22.18 |
| 4,152,173 | 5/1979 | Jackson et al. | 134/170 |
| 4,380,478 | 4/1983 | Cooney | 134/900 |
| 4,811,749 | 3/1989 | Dixon | 134/900 |
| 4,854,336 | 8/1989 | Byzitter | 134/166 R |

FOREIGN PATENT DOCUMENTS

| | | | |
|---|---|---|---|
| 38 942 | 5/1965 | Germany . | |
| 74 972 | 7/1970 | Germany . | |
| 42 93 178 | 10/1993 | Germany . | |
| 33796 | 11/1912 | Sweden | 134/199 |

Primary Examiner—Frankie L. Stinson
Attorney, Agent, or Firm—Flynn, Thiel, Boutell & Tanis, P.C.

[57] ABSTRACT

The present invention refers to a device for cleaning milking cups. Known devices of this type have a cleaning element which is adapted to be attached to a milking cup and which is adapted to be used for rinsing the milking-cup interior and for spraying rinsing liquid onto the end face of the milking cup so as to clean the outer surface thereof. The present invention provides an improved cleaning device comprising a cleaning element which is adapted to be attached to the milking cup such that a flow chamber is formed for producing a rinsing flow along an outer surface area of the milking cup which is to be cleaned. By means of this solution according to the present invention, an improved cleaning effect is achieved and the rinsing agent conducted through the flow chamber can then be used for cleaning the interior of the milking cup.

29 Claims, 4 Drawing Sheets

DEVICE FOR CLEANING MILKING CUPS

The present invention refers to a device for cleaning milking cups according to the generic clause of claim 1.

Devices used in milking machines for cleaning the milking cups and the milk lines extending from said milking cups are known, said devices having a cleaning element which is adapted to be attached to the open end of the respective milking cups and by means of which rinsing liquid is conducted into the interior of the milking cup so that the milking cup interior and the milk line extending from said milking cup interior are cleaned by the rinsing liquid. In most cases, the milking cup to be cleaned and the cleaning element attached thereto are incorporated in a closed rinsing-agent circuit.

It turned out that cleaning which is limited to the interior of the milking cup and which primarily serves to remove milk residues does not suffice in the long run, and that it is also necessary to clean the outer surface of the milking cup.

DE 38 31 601 A1 discloses a device for cleaning the outer contours of teat cups and milking cups, respectively; in said device, the milking cups are arranged in a housing in which rotating brush heads are provided for the purpose of cleaning. The brush heads especially act on the open end portion of the milking cups, a cleaning liquid being supplied simultaneously.

A further cleaning device is known from DE 42 93 178 T1. This known device comprises a cleaning element including a component which is adapted to be introduced in the opening of the milking cup and which is provided with a rinsing-water nozzle, said component being used for cleaning the interior of the milking cup. The cleaning element is additionally provided with rinsing-water nozzles, which, in the attached condition of said cleaning element, spray cleaning liquid onto the end face of the milking cup for cleaning the outer surface thereof. In order to prevent excessive lateral splashing of the cleaning liquid sprayed onto said end face, the cleaning element is provided with a bell-shaped shield partially enclosing said milking cup. Since the cleaning liquid penetrates into the surroundings, it must not contain any intensively active cleaning agents.

AU-B-564242 discloses a device according to the generic clause of claim 1, which includes a cleaning element comprising a cup-shaped member and a pin projecting from the cup base coaxially with the cup member and having an annular constriction. When a cleaning operation is carried out, the opening edge of the teat-rubber opening projects into said constriction and the cup-shaped member circumferentially abuts on the edge of the teat-rubber end face so that an annular rinsing chamber is formed. A rinsing flow is discharged from the pin close to the cup base and flows first approximately in a direction at right angles to the end face of the teat rubber and then approximately parallel to the end face of the teat rubber towards the teat-rubber opening.

It is the object of the present invention to provide a cleaning device according to the generic clause of claim 1, which is used for cleaning milking cups, which has been improved in comparison with the prior art as far as the cleaning of the outer surfaces of the milking cups is concerned, and which satisfies the increased demands on hygienic milk production.

The device according to the present invention by means of which this object is achieved is characterized in that the cleaning element is adapted to be attached to said milking cup such that a flow chamber is formed for producing a rinsing flow along an outer surface area of the milking cup which is to be cleaned.

By means of this solution according to the present invention, an intensive cleaning flow can be produced across a surface area of the milking cup to be cleaned; said surface area can also comprise lateral surface areas of the milking cup, in addition to the end face at the open end. By means of this cleaning flow, it is especially possible to prevent, even at the lateral surface areas of the milking cup, the formation of germ centres over a prolonged period of time; hence, a transfer of germs from animal to animal can be prevented, especially the transfer of particularly dangerous staphylococci.

According to a preferred embodiment, the interior of the milking cup defined by the elastic suction element (teat rubber) is in flow connection with the flow chamber for successive rinsing operations and, especially, it is open towards said flow chamber. Due to this connection between the flow chamber and the interior of the milking cup, the outer and the inner surfaces of the milking cup can be cleaned simultaneously, the flow chamber and the milking-cup interior being preferably incorporated in a closed rinsing-agent circuit including also the milk line which extends from the milking cup. This will prevent the cleaning liquid from penetrating into in the surroundings.

A special advantage of the combined outer and inner cleaning according to the present invention also resides in the fact that the outer rinsing will also effect cleaning of the cleaning element itself so that a transfer of germs from the cleaning element via the milking cup to the animal can be prevented.

According to an advantageous embodiment of the present invention, the cleaning element has a cap-shaped or cup-shaped structural design and is adapted to be attached to the open end of the milking cup, whereby a cap-shaped flow chamber is formed, which is sealed due to the fact that essentially the edge of the cup abuts on the milking cup, and means are provided for producing a rinsing flow corresponding to this shape of the flow chamber. In accordance with this embodiment, an annular rinsing flow, which is rotationally symmetric with regard to the longitudinal axis of the milking cup, is produced in an advantageous manner. By means of this rinsing flow, in the case of which the rinsing agent can first flow longitudinally along the sides of the milking cup and then across the end face of said milking cup in the radial direction towards the cup opening, thorough cleaning of the milking-cup end including the opening will be achieved.

The means for producing an annular rinsing flow preferably include a rinsing-agent loop line which extends approximately at the edge of the cup and which is open towards the flow chamber, said loop line discharging rinsing agent into the annular flow chamber in a uniformly distributed manner along the circumference thereof.

Another preferred embodiment is provided with the features that, for producing an annular rinsing flow, the cup-shaped cleaning element is implemented as a double-walled element with a space between the walls. Said space between the walls is provided with a rinsing-agent connecting piece which is preferably arranged such that it is concentric with the axis of the cleaning element and of the milking cup, respectively. Rinsing liquid supplied to said space between the walls can pass from said space between the walls through an annular opening or through openings distributed in an annular arrangement into the flow chamber while producing an annular rinsing flow.

In accordance with a further advantageous embodiment of the present invention, the cleaning element can be provided with a sealing lip abutting, in the attached condition, on the milking cup, especially on the outer surface of the teat rubber, or the teat rubber is provided with a sealing lip abutting on the cleaning element in the attached condition of said cleaning element so as to seal the flow chamber.

According to an advantageous embodiment, the sealing lip can constitute part of a locking means which serves to fasten the cleaning element to the milking cup; when the cleaning element is locked in position, said cleaning element is arrested on the milking cup in such a way that a constant volume of the flow chamber and, consequently, a constant flow rate of the rinsing agent are guaranteed by fixed wall distances.

For guaranteeing a sufficient rinsing-agent flow rate, one advantageous embodiment is additionally provided with spacers which are connected to the cleaning element and which project towards the surface area of the milking cup to be cleaned.

In accordance with an advantageous embodiment, the cleaning element additionally includes a component projecting into the milking-cup interior in the attached condition, said component guaranteeing a particularly fast and intensive rinsing flow by suitably narrowing the cross-section of the milking cup interior in the area accommodating the teats.

According to a special embodiment, the cleaning element is connected to a fastening bow which is adapted to be locked in position on the sleeve member of the milking cup and by means of which the cleaning element is secured to and arrested on the milking cup. This fastening bow can include a rinsing line which defines a rinsing branch and which, in the locked condition of said bow, is connected to an air inlet valve provided on the sleeve member, said air inlet valve being connected to the milk line. By means of such an arrangement, the milking cup can be cleaned thoroughly, said cleaning including also the air inlet valve.

Other possible advantageous embodiments of the present invention are disclosed in the subclaims.

Figure 2:
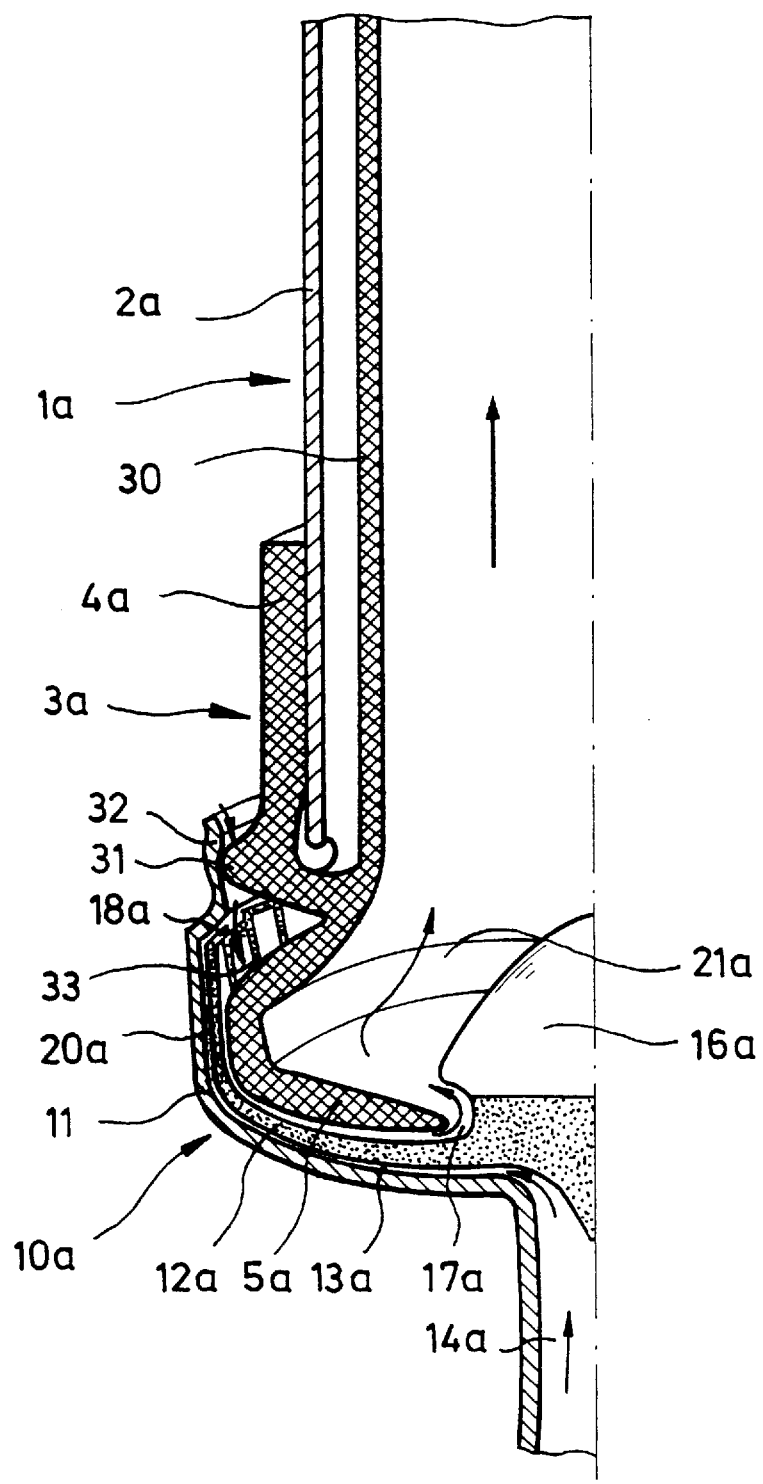
Figure 3:
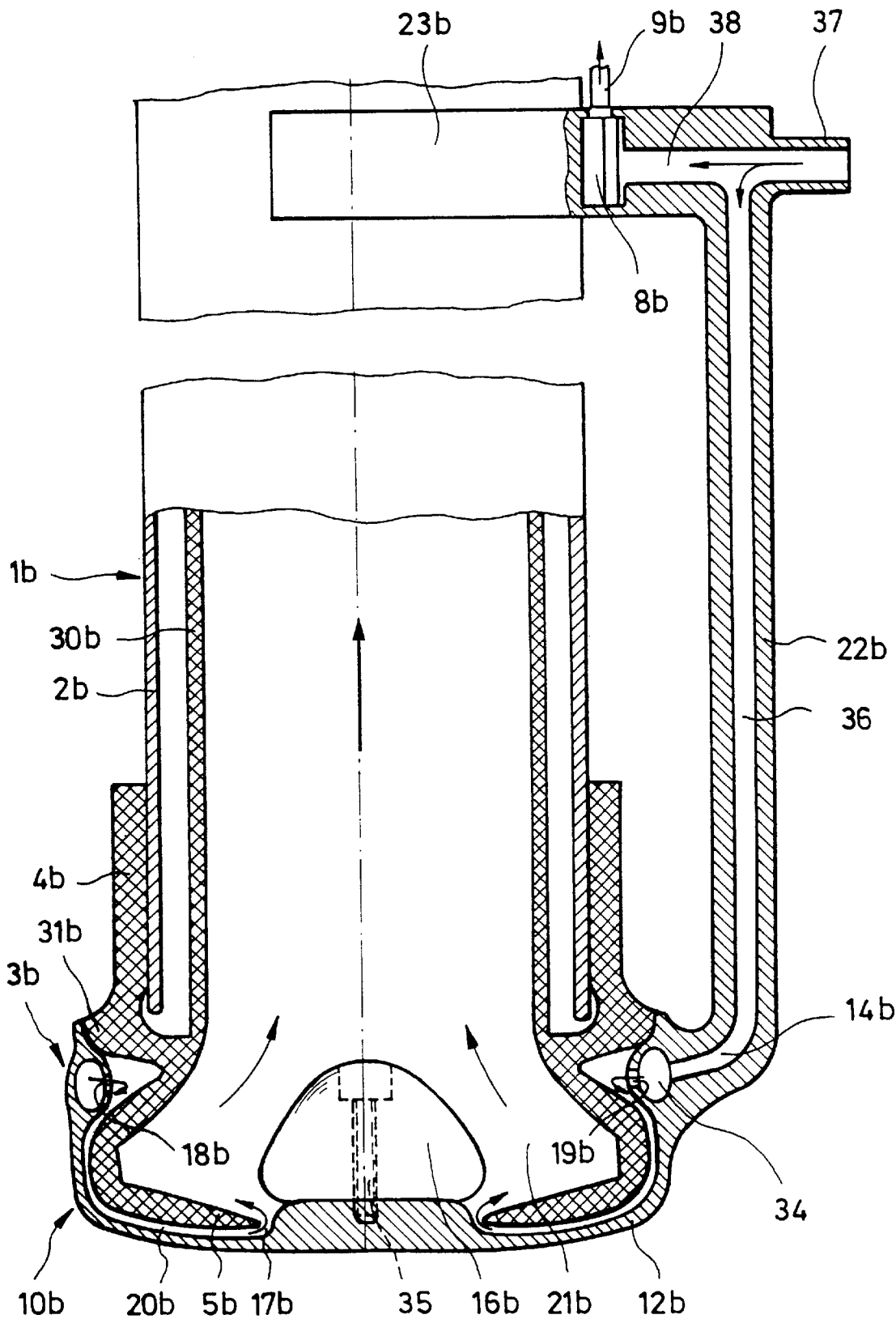
Figure 4:
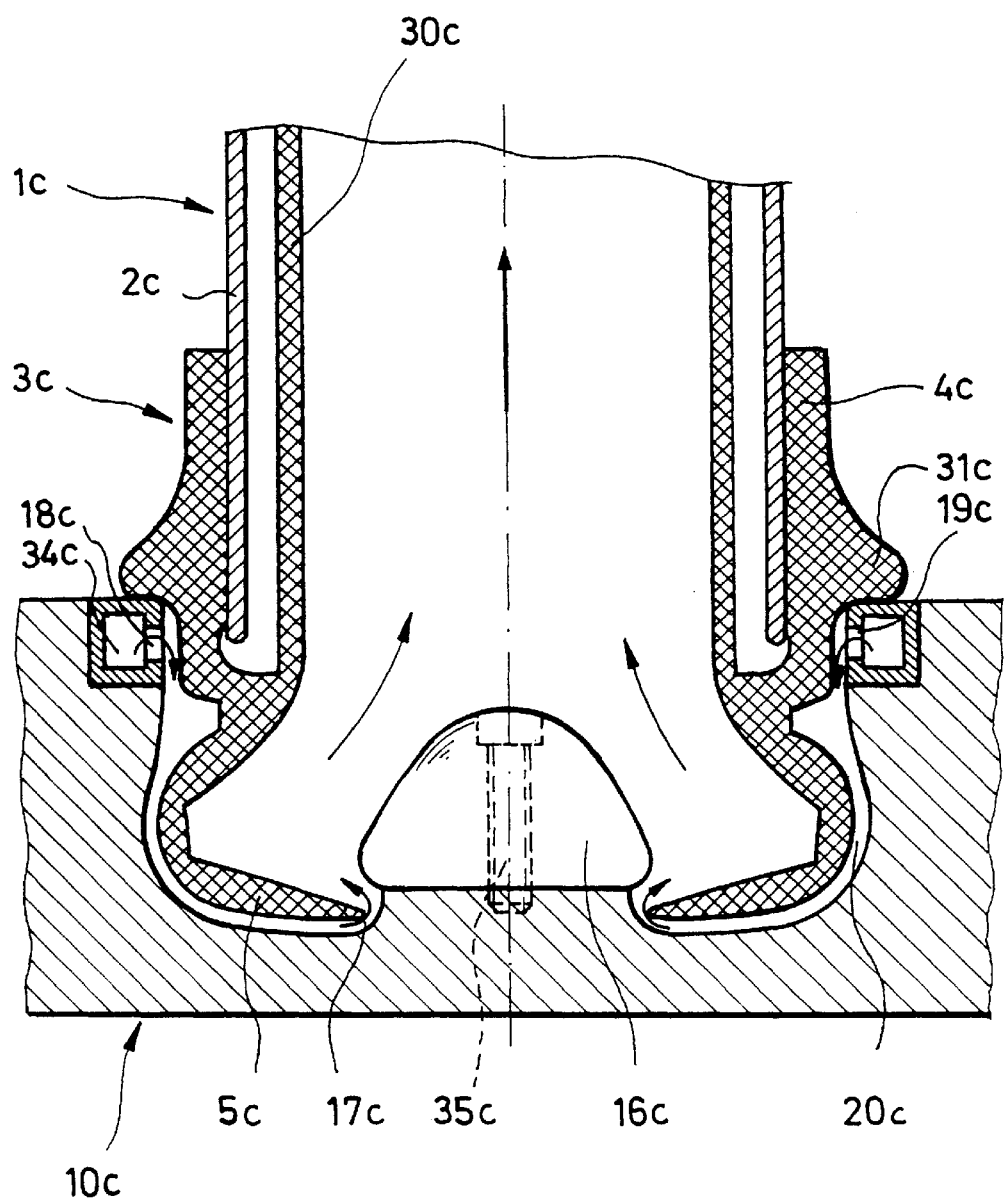

The present invention will now be explained and described in detail on the basis of embodiments and on the basis of the drawings enclosed, which refer to these embodiments and in which FIG. 1 shows a first embodiment of a device according to the present invention, which is provided with a cleaning element connected to a fastening bow, FIG. 2 shows a second embodiment of a cleaning device according to the present invention, which is provided with a cleaning element that is adapted to be locked in position on a teat rubber of a milking cup, FIG. 3 shows a further embodiment of a device according to the present invention, which is provided with a cleaning element including a loop line through which a rinsing liquid flows so as to produce an annular flow, FIG. 4 shows a further embodiment of a device according to the present invention including a cleaning element which is defined by a carrier plate.

In FIG. 1, reference numeral 1 designates a milking cup comprising a metallic sleeve member 2 and a teat cup 3 consisting of an elastic material, e.g. rubber in the present case. The teat rubber 3 comprises a component 4 put over the sleeve member 2, a lip member 5 following said component 4, and an inner component which extends through the sleeve member 2 and which is not visible in FIG. 1. The flexible inner component defines an interior member which is adapted to be acted upon by a vacuum and and which is arranged subsequent to a part 21 of the milking cup interior and communicates with a milk-line connection 6, said part 21 being defined by the lip member 5. The sleeve member 2 is provided with a connection 7 which is adapted to be connected to a vacuum receptacle, the space defined by said sleeve member 2 and the teat rubber inner component being open towards said connection 7. The sleeve member 2 has additionally provided thereon an air inlet valve 8 communicating via a connection line 9 with said milk-line connection 6.

Reference numeral 10 designates in FIG. 1 a cleaning element implemented as a double-walled element comprising an outer wall 11 and an inner wall 12. Between said outer wall 11 and said inner wall 12, a space 13 is defined, which communicates with a connecting piece 14 for a rinsing-agent line, which is not shown in FIG. 1. In the embodiment shown, the connecting piece 14 is arranged such that it is concentric with the axis of the cup-shaped cleaning element 10. In the arrangement shown in FIG. 1, where the cleaning element 10 is attached to the milking cup 1, the connecting piece 14 of the rinsing-agent line is also arranged concentrically with the longitudinal axis of the milking cup 1. At the edge of the cup-shaped cleaning element, the inner wall 12 is angled outwards and extends over the outer wall 11 so that the space 13 is closed at the edge of the cup-shaped cleaning element. The cup edge has attached thereto an annular sealing element 15 abutting with a lip on the teat-rubber component 4 put over the sleeve member 2 of the milking cup 1. It would also be imaginable to provide sealing means further up on the sleeve member 2. On the base of the inner wall 12, a component 16 is arranged concentrically with the cup axis and the milking cup axis, respectively, said component 16 projecting into the interior part 21 defined by the lip member 5 of the teat rubber 3. Component 16 is provided with a constriction into which the lip member 5 of the teat rubber 3 projects such that a gap 17 is defined between said lip member 5 and said projecting component 16. The inner wall of the cup is additionally provided with openings 18 and 19. Further openings of this type, which are not visible in FIG. 1, are uniformly distributed over the circumference of said inner wall 12.

The inner wall 12, the sealing element 15 and the teat rubber 3 define a flow chamber 20 which is concentric with the longitudinal axis of the milking cup 1 and which is sealed from its surroundings by the lip of said sealing element 15. The flow chamber 20 communicates with the space 13 between the inner wall 12 and the outer wall 11 of the cup-shaped cleaning element 10 via the openings 18 and 19 and via the above-mentioned additional openings of this type. The flow chamber 20 also communicates via the gap 17 with the milking-cup interior part 21 defined by the teat rubber, said gap 17 being formed between the lip member 5 and the constriction of the projecting component 16.

In the embodiment shown, the cleaning element 10 is connected to one end of a fastening bow 22 at the rinsing-agent connecting piece 14, the other end of said fastening bow 22 being connected to the sleeve member 2 of the milking cup 1. For the purpose of fixing, the fastening bow 22 is provided with two springy components extending around the sleeve member 2, one of said components, viz. component 23, being shown in FIG. 1. An arresting effect in the direction of the longitudinal axis of the milking cup is produced due to the fact that the air inlet valve 8, which projects beyond the sleeve member 2, is locked in position in a suitable recess provided in said fastening bow 22.

In the embodiment shown, a fastening bow which is hollow in the interior thereof is provided and a rinsing-agent line 24 extends through said fastening bow, one end of said rinsing-agent line 24 being in fluid communication with the rinsing-agent connecting piece 14 and the other end thereof being connected to a distributor means 25 which is provided for rinsing the valve 8 and which establishes a connection to said valve 8.

The fastening bow 22 is additionally provided with two fastening hooks 26 and 27.

In the embodiment shown, the cleaning element 10 and the fastening bow 22 are plastic components. The sealing element 15 is produced from a suitable flexible material, such as rubber. The rinsing-agent line 24 extending through the fastening bow 22 also consists of a flexible material in the embodiment shown, and the respective ends of said rinsing-agent line 24 are attached to connecting pieces 28 and 29.

For cleaning the milking cup 1 with the aid of the device shown, a rinsing agent is caused to flow through said milking cup according to the flow-indicating arrows shown in the drawing.

Via the rinsing-agent connecting piece 14, a rinsing agent is supplied, which flows partly into the space 13 and partly into the rinsing-agent line 24. Due to the concentric arrangement of said connection piece 14, the rinsing agent will uniformly distribute in said space 13 and, due to the openings 18 and 19 distributed over the circumference, an annular flow which is concentric with the longitudinal axis of the milking cup will be produced in the flow chamber 20 when the rinsing agent flows into said flow chamber 20, said annular flow flowing first along the longitudinal outer side of the milking cup and then along the outer side of the end face in the radial direction to the opening 17 defined between the lip member 5 and the projecting component 16 into the milking-cup interior 21 defined by the teat rubber 3. In said milking-cup interior 21, the flow of rinsing agent will continue in a concentric form. By means of the flow described, the rinsing agent will clean the outer side of the milking cup as well as the interior thereof. The narrow space between the inner wall 12 and the lip member 5 and the resultant small flow cross-section guarantee a high flow velocity of the flow of rinsing agent and, consequently, a high cleaning efficiency. In the interior 21 of the milking cup, the projecting component 16 provides a suitable restriction of the flow cross-section guaranteeing a high efficiency of the rinsing agent. The rinsing liquid flows through the whole milking-cup interior and, subsequently, through the milk line, which is not shown in FIG. 1 and which communicates with the milk-line connection 6.

A closed rinsing-agent circuit is preferably provided, in which the rinsing agent is caused to flow by means of a suction vacuum applied to the milk line. It is, however, also possible to use a forcing pump for producing the flow of rinsing agent. Contrary to the direction shown, the flow of rinsing agent may also be produced in the opposite direction.

Deviating from the embodiment shown in FIG. 1, the inner wall 12 of the cleaning element 10 may also be provided with spacers which project towards the outer surface of the milking cup and which prevent the flexible teat rubber from abutting on said inner wall 12, whereby the flow cross-section would be narrowed excessively. It will be expedient to implement these spacers as webs extending in the direction of flow.

The rinsing agent flowing in the rinsing-agent line 24 is distributed throughout the valve 8 via the distributor means 25 so as to rinse said valve 8 and returns through the open valve 8 and via the connection line 9 to the main flow of rinsing agent flowing through the milk-line connection 6. It follows that the rinsing-agent line 24 forms a branch of the flow of rinsing agent.

Rinsing agents which are adapted to be used are, in addition to water, primarily liquids which may contain intensive cleaning agents. After rinsing by means of a liquid, additional rinsing by means of pressurized air can be carried out so as to remove rinsing-agent residues from the milking cup and the system of lines.

It will be expedient to provide in a milking machine a plurality of the cleaning elements with fastening bow which are shown in FIG. 1, the number of cleaning elements being, for example, such that it suffices for a set of milking cups. During the cleaning process, the cleaning elements connected to the milking cups can be held with the aid of the hooks 26 and 27 on a suitable suspension or with the aid of other suitable means.

In FIG. 2, parts corresponding to parts shown in FIG. 1 are designated by identical reference numerals, said reference numerals having, however, added thereto the letter a.

The embodiment shown in FIG. 2 differs from the embodiment according to FIG. 1 primarily with regard to the fact that the element used for fastening and arresting a cleaning element 10a on a milking cup 1a is not a fastening bow, but that the cleaning element 10a snaps into position on the teat rubber 3a of the milking cup 1a; for this purpose, an annular shoulder 31 projecting from the teat rubber 3a engages a complementary locking groove 32 of the cleaning element 10a. The projecting annular shoulder 31 serves simultaneously as a sealing lip.

A further difference with regard to the embodiment according to FIG. 1 is to be seen in the fact that an inner wall corresponding to the inner wall 12 is defined by an insertion member 12a. Spacers project from said insertion member 12a towards an outer wall 11a of the cleaning element 10a as well as towards a lip member 5a of a teat rubber 3a. Among the above-mentioned spacers only spacers 33 are shown in FIG. 2. The insertion member 12a of the embodiment shown is also provided with a component 16a having a constriction and projecting into a milking cup interior 21a defined by the teat rubber, the lip member 5a projecting into the constriction such that a gap 17a is defined between said lip member and said constriction. Reference numeral 30 designates in FIG. 2 the teat rubber part which is not visible in FIG. 1 and by means of which a flexible hose is defined in the interior of the milking cup.

For cleaning the milking cup 1a, the cleaning element 10a, which is connected via a line connecting piece 14a to a rinsing-agent line not shown in FIG. 2, is attached to the teat rubber 3a of the milking cup 1a, the locking groove 32 of the outer wall 11a of the cleaning element 10a being in this condition lockingly engaged by the annular shoulder 31. Due to this locking engagement, the cleaning element is sufficiently fixed to and arrested on the milking cup so that no additional holding means are required. The projecting annular shoulder 31 simultaneously seals the flow chamber 20a formed between the insertion member 12a and the lip member 5a. As can be seen from the flow-indicating arrows shown in the drawing, the rinsing agent supplied via the rinsing-agent connecting piece 14a flows in a stream that is coaxial with the longitudinal axis of the milking cup through the space 13a formed between the outer wall 11a of the cleaning element 10a and the insertion member 12a and reaches the flow chamber 20a through openings 18a which are uniformly distributed over the circumference of said insertion member 12a; in the flow chamber 20a, said stream flows along the teat-rubber surface to be cleaned and effects cleaning of said surface. Through the opening 17a the rinsing agent then reaches the milking-cup interior 21a where it effects rinsing of said interior 21a. As in the case of the preceding embodiment, the flow cross-section is limited due to the use of the projecting component 16a so that a sufficiently intensive rinsing flow is guaranteed also in the interior. Said interior 21a is connected to a milk line, which extends from the milking cup 1a and which is not shown in FIG. 2, through the hoselike teat-rubber component 30 so that rinsing is effected not only in the milking cup 1a but also in the milk line following said milking cup.

In FIG. 3, parts corresponding to parts shown in the preceding figures are designated by identical reference numerals, said reference numerals having, however, added thereto the letter b.

The essential difference between the embodiment according to FIG. 3 and the preceding embodiments is the manner in which the rinsing agent is supplied.

In the case of this embodiment, a cup-shaped cleaning element 10b is implemented only as a single-walled plastic component having a wall 12b. Close to the edge of the cup-shaped cleaning element 10b, a loop line 34 is provided, said loop line 34 having openings which are distributed over the circumference thereof; FIG. 3 shows openings 18b and 19b of these openings. The loop line communicates with a rinsing-agent supply line 36 provided in a fastening bow 22b which is connected to the cleaning element 10b.

The loop-line openings 18b and 19b establish a connection to a flow chamber 20b defined between the wall 12b and a lip member 5b of a teat rubber 3b of a milking cup 1b. In the embodiment shown, a component 16b projecting into a milking-cup interior 21b is adapted to be connected to the rest of the cleaning element 10b by means of a screw 35. The teat rubber 3b is provided with an annular shoulder 31b abutting on the cleaning element 10b, whereby the flow chamber 20b is sealed.

The fastening bow 22b can be fixed at its end located opposite the cleaning element 10b, said fixing being effected by means of springy components extending around the milking cup 1b, one of said components, viz. component 23b, being shown in the figure; an air inlet valve 8b, which projects beyond the sleeve member 2b of the milking cup 1b, is locked in position in a suitable recess of the fastening bow 22b, whereby the arrangement comprising the cleaning element and the fastening bow is arrested. At this fastening end, the fastening bow 22b is additionally provided with a rinsing-agent connecting piece 37 communicating with the rinsing-agent supply line 36, which is formed by a rigid tube in the present case, as well as with a line 38 providing the air inlet valve 8b with rinsing agent for the purpose of cleaning.

For cleaning the milking cup 1b, the component comprising the cleaning element 10b and the fastening bow 22b is secured to said milking cup 1b, the projecting valve 8b being locked in position in a suitable recess of the fastening bow 22b, whereby the above-mentioned arrangement is arrested. In this locked condition, the annular shoulder 31b of the teat rubber 3b abuts on the cleaning element 10b whereby the flow chamber 20b is sealed. Rinsing agent supplied through the connecting piece 37 flows through the line 36 as well as through the line 38. The rinsing agent flowing through the line 36 enters the loop line 34 and flows via the openings 18b and 19b (and additional openings of this type which are not shown) into the flow chamber 20b where, in correspondence with the preceding embodiments, an annular flow forms which is coaxial with the longitudinal axis of the milking cup 1b and which cleans the outer surface of the teat rubber. Through the opening 17b, the rinsing agent additionally flows into the milking-cup interior 21b, flows through the whole interior of said milking cup 1b and enters finally a milk line which is connected to the milking cup and which is not shown in FIG. 3. Rinsing agent flowing through the line 38 serves to rinse the valve 8b and flows via a connection 9b into said milk line.

The use of the annular chamber according to the embodiment disclosed in FIG. 3 makes a double-walled structural design of the cleaning element unnecessary so that the structural design of the cleaning device as a whole is simple.

In the case of the embodiment shown in FIG. 4, parts corresponding to parts shown in the preceding figures are designated by identical reference numerals, said reference numerals having, however, added thereto the letter c.

The essential difference between the embodiment according to FIG. 4 and the embodiment according to FIG. 3 is that a cleaning element 10c is formed by a plate provided with a recess for receiving therein the end portion of a milking cup 1c including the opening. Said plate may be provided with a plurality of such recesses for receiving therein a plurality of milking cups. A loop line 34c is provided in said plate defining the cleaning element 10c, said loop line 34c communicating with a rinsing-agent supply line which is not shown in FIG. 4.

For the purpose of cleaning, the milking cup 1c is inserted into the recess of said plate, a teat rubber 3c of the milking cup 1c resting on the edge of said recess via a projecting annular shoulder 31c whereby the flow chamber 20c formed between the teat rubber and the plate is sealed. For holding the milking cup 1c at the position where it abuts on the plate via said annular shoulder 31c, additional holding means can be used, which are not shown in FIG. 4.

In contrast to the embodiments shown, the flow chamber could be designed such that a rinsing flow is conducted only across the milking-cup end face including the opening or across part of said end face, or such that a flow is conducted in such a way that also the sleeve member is rinsed at least partially. For conducting a rinsing flow across the end face, an inner wall corresponding to the inner wall 12 could extend only above said end face.

We claim:

1. A combination of a milking cup and a device for cleaning milking cups, the milking cup having an elastic suction element, the device for cleaning milking cups comprising a cleaning element which supplies a rinsing agent and which is adapted to be attached to said milking cup and used for rinsing said milking cup, said cleaning element being adapted to be attached to the milking cup such that a flow chamber is formed for producing a rinsing flow acting on an outer surface of the milking cup to be cleaned, wherein the flow chamber comprises a flow restriction wall which extends in opposed, spaced relationship with the outer surface to be cleaned and which is used for producing a rinsing flow conducted between said flow restriction wall and said outer surface from a rinsing-agent inlet to a rinsing-agent outlet essentially along said outer surface, said milking cup being in flow connection with said flow chamber for successive rinsing operations and being open toward said flow chamber.

2. The combination according to claim 1, wherein the flow chamber extends in the shape of a cap or cover which is attached to the open end of the milking cup, whereby the rinsing flow is produced at least along part of the milking-cup end face including the milking-cup opening.

3. The combination according to claim 1, wherein the cleaning element has a cap-shaped or cup-shaped structural design and is adapted to be attached to the open end of the milking cup, whereby a cap-shaped flow chamber is formed, which is sealed by the edge of the cap or of the cup abutting the milking cup, and wherein the cleaning element is provided with means for producing a rinsing flow corresponding essentially to the shape of the flow chamber.

4. The combination according to claim 3, wherein the means for producing the rinsing flow include a rinsing-agent loop line which extends approximately at the edge of the cup and which is open towards the flow chamber.

5. The combination according to claim 3, wherein, for producing the rinsing flow, the cleaning element is a double-walled element with a space between the walls, said space between the walls being proved with a rinsing-agent connecting piece and being open towards the flow chamber in an annular shape.

6. The combination according to claim 5, wherein the rinsing-agent connecting piece is arranged such that it is concentric with the axis of the cleaning element and, in the attached condition of the cleaning element, concentric with the axis of the milking cup.

7. The combination according to claim 1, wherein the cleaning element is provided with a sealing lip abutting, in the attached condition, on the outer surface of the elastic suction element.

8. The combination according to claim 1, wherein the elastic suction element has a sealing lip abutting the cleaning element in the attached condition of said cleaning element.

9. The combination according to claim 1, wherein the cleaning element is provided with spacers projecting towards the outer surface area of the milking cup to be cleaned preventing the elastic suction element from contacting the cleaning element.

10. The combination according to claim 9, wherein said spacers extend in the direction of rinsing flow.

11. The combination according to claim 1, wherein means are provided for fastening the cleaning element to the milking cup.

12. The combination according to claim 11, wherein the milking cup has a sleeve member, the fastening means comprise a fastening bow which is connected to the cleaning element and which is adapted to be locked in position on the sleeve member of the milking cup whereby said cleaning element is arrested.

13. The combination according to claim 12, wherein the sleeve member of the milking cup has a protruding air inlet valve which is adapted to be used as a locking projection.

14. The combination according to claim 13, wherein the fastening bow includes a rinsing-agent line which is adapted to be connected to the air inlet valve when the locking engagement is effected.

15. The combination according to claim 12, wherein the flow chamber is arranged in a closed rinsing-agent circuit including the milk line which extends from the milking cup.

16. The combination according to claim 15, wherein a branch of the rinsing-agent circuit can be established through the rinsing-agent line of the fastening bow.

17. The combination according to claim 11, wherein locking means are formed on the milking cup and on the cleaning element and which guarantee that the cleaning element is arrested relative to the milking cup.

18. The combination according to claim 17, wherein, for the purpose of fastening to the milking cup, the cleaning element is adapted to be brought into locking engagement with the elastic suction part.

19. The combination according to claim 18, wherein the cleaning element is adapted to be brought into locking engagement with the elastic suction part in such a way that the flow chamber is sealed.

20. The combination according to claim 17, wherein said locking means is on the elastic suction part of said milking cup.

21. The combination according to claim 1, wherein a forcing pump or a suction pump is provided for producing the rinsing flow.

22. The combination according to claim 1, wherein the cleaning element includes a component projecting into the milking-cup interior defined by the elastic suction part, said component serving to reduce the rinsing flow cross-section within said milking cup interior.

23. A cleaning element which is adapted to be attached to a milking cup for rinsing the inner and outer surfaces of said milking cup, said cleaning element being attached such that a flow chamber is formed having means for producing an outer rinsing flow along the outer surface of the milking cup which is to be cleaned and thereafter for producing an inner rinsing flow for cleaning the inner surface of the milking cup, the flow chamber comprises a rinsing agent inlet, a rinsing agent outlet at least partially bound by the teat-receiving opening in the milking cup, and a flow restriction wall which extends in an opposed, spaced relationship with the outer surface to be cleaned, and the flow restriction wall conducting the outer rinsing flow between said flow restriction wall and said outer surface from the rinsing-agent inlet to the rinsing-agent outlet essentially along said outer surface in a first direction, the rinsing agent outlet flowing the inner rinsing flow into the interior of the milking cup from the flow chamber in a second direction.

24. A cleaning element according to claim 23, wherein a locking device fixes the cleaning element on the milking cup.

25. A combination of a milking cup, a teat rubber for attachment to the milking cup, and a cleaning element, the teat rubber having a holding edge extending around the milking cup, a locking element fastening the cleaning element to the teat rubber, the cleaning element being attached to the teat rubber such that a flow chamber is formed for rinsing the outer surface of the teat rubber, and the locking element having a sealing bead for sealing said flow chamber and extending circumferentially on the same level as the holding edge of said teat rubber.

26. The combination according to claim 25, wherein the teat rubber is mounted on a sleeve member of the milking cup, the locking element and/or the sealing bead are provided on a part of the teat rubber which abuts on the outer side of the sleeve member.

27. A method of cleaning milking cups, comprising the step of rinsing the milking cup by first conducting a rinsing flow along an area of the outer surface of the milking cup which is to be cleaned, wherein a flow restriction wall is arranged in opposed, spaced relationship with the outer surface to be cleaned and that a rinsing flow is conducted between said flow restriction wall and said outer surface from a rinsing-agent inlet to a rinsing-agent outlet essentially along said outer surface, and then conducting the rinsing flow into the interior of the milking cup.

28. A method according to claim 27, wherein the outer surface of the milking cup and the milking cup interior formed by teat rubber are rinsed successively.

29. A method of cleaning milking cups, comprising the step of rinsing the milking cup by conducting a rinsing flow along an area of the outer surface of the milking cup which is to be cleaned, wherein a flow restriction wall is arranged in opposed, spaced relationship with the outer surface to be cleaned and that a rinsing flow is conducted between said flow restriction wall and said outer surface from a rinsing-agent inlet to a rinsing-agent outlet essentially along said outer surface, and producing the rinsing flow concentric with the longitudinal axis of the milking cup and which flows off into the teat opening.

* * * * *